US010725364B2

(12) United States Patent
Hamamura

(10) Patent No.: US 10,725,364 B2
(45) Date of Patent: Jul. 28, 2020

(54) PROJECTOR AND DRIVE CONTROL METHOD

(71) Applicant: NEC Display Solutions, Ltd., Tokyo (JP)

(72) Inventor: Shigeo Hamamura, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 3 days.

(21) Appl. No.: 16/065,048

(22) PCT Filed: Aug. 31, 2016

(86) PCT No.: PCT/JP2016/075521
§ 371 (c)(1),
(2) Date: Jun. 21, 2018

(87) PCT Pub. No.: WO2018/042560
PCT Pub. Date: Mar. 8, 2018

(65) Prior Publication Data
US 2019/0018309 A1 Jan. 17, 2019

(51) Int. Cl.
G03B 21/20 (2006.01)
G02B 26/00 (2006.01)
(Continued)

(52) U.S. Cl.
CPC ....... *G03B 21/2033* (2013.01); *G02B 26/008* (2013.01); *G02B 27/141* (2013.01);
(Continued)

(58) Field of Classification Search
CPC .... G02B 26/008; G03B 21/204; G03B 33/08; G03B 33/10; H04N 9/3111; H04N 9/3114; H04N 9/3117; H04N 9/31–3197
See application file for complete search history.

(56) References Cited

U.S. PATENT DOCUMENTS

2007/0086098 A1* 4/2007 Sekiguchi ............ G02B 26/008
359/892
2009/0073592 A1* 3/2009 Huang ................. G02B 26/008
359/892
(Continued)

FOREIGN PATENT DOCUMENTS

CN 1987552 A 6/2007
CN 101387724 A 3/2009
(Continued)

OTHER PUBLICATIONS

International Search Report (ISR) (PCT Form PCT/ISA/210), in PCT/JP2016/075521, dated Nov. 29, 2016.
(Continued)

*Primary Examiner* — Cara E Rakowski
*Assistant Examiner* — Christopher A Lamb, II
(74) *Attorney, Agent, or Firm* — McGinn I. P. Law Group, PLLC.

(57) ABSTRACT

A projector has: a plurality of light sources, a plurality of phosphor wheels to which are affixed a plurality of arc-shaped segments of phosphor that takes as excitation light the light from the light sources to emit light, a synthesizing optical system that synthesizes light emitted by the plurality of phosphor wheels, and a phosphor rotation control unit that controls the rotation of the plurality of phosphor wheels such that the timing at which the quantity of light emitted by the phosphor wheels becomes a minimum value differs for each of the plurality of phosphor wheels.

16 Claims, 6 Drawing Sheets

(51) Int. Cl.
  *G02B 27/14* (2006.01)
  *H04N 9/31* (2006.01)
  *G03B 33/08* (2006.01)
(52) U.S. Cl.
  CPC ......... *G03B 21/204* (2013.01); *G03B 21/206* (2013.01); *G03B 21/2013* (2013.01); *G03B 33/08* (2013.01); *H04N 9/3158* (2013.01); *H04N 9/3164* (2013.01); *H04N 9/3194* (2013.01)

(56) References Cited

U.S. PATENT DOCUMENTS

| | | | |
|---|---|---|---|
| 2014/0226306 A1 | 8/2014 | Khan et al. | |
| 2014/0254130 A1* | 9/2014 | Mehl | G03B 21/204 362/84 |
| 2016/0004148 A1* | 1/2016 | Chiu | G03B 21/204 353/84 |
| 2016/0161835 A1* | 6/2016 | Schnarrenberger | G03B 21/2073 362/19 |

FOREIGN PATENT DOCUMENTS

| | | |
|---|---|---|
| CN | 104020634 A | 9/2014 |
| JP | 2009-036935 A | 2/2009 |
| JP | 2011-158726 A | 8/2011 |
| JP | 2012-129135 A | 7/2012 |
| JP | 2012-212129 A | 11/2012 |
| JP | 2013-011794 A | 1/2013 |
| JP | 2013-057850 A | 3/2013 |
| JP | 2013-164555 A | 8/2013 |
| JP | 2014-56074 A | 3/2014 |
| JP | 2014-149513 A | 8/2014 |
| JP | 2014-170749 A | 9/2014 |
| JP | 2014-235323 A | 12/2014 |
| JP | 2015-118139 A | 6/2015 |
| JP | 2015-203741 A | 11/2015 |
| JP | 2016-14855 A | 1/2016 |
| JP | 2016-031402 A | 3/2016 |
| WO | WO 2005/101090 A1 | 10/2005 |
| WO | WO 2013/021773 A1 | 2/2013 |
| WO | WO 2014/174559 A1 | 10/2014 |
| WO | WO 2017/081741 A1 | 5/2017 |

OTHER PUBLICATIONS

Decision to Grant a Patent dated Aug. 20, 2019, in Japanese Application No. 2018-536589 and English Translation thereof.
Chinese Office Action, dated Apr. 22, 2020, in Chinese Application No. 201680078733.4 and English Translation thereof.

* cited by examiner

PROJECTOR AND DRIVE CONTROL METHOD

TECHNICAL FIELD

The present invention relates to a projector provided with a plurality of phosphor wheels and to a method of controlling the drive of the phosphor wheels.

BACKGROUND ART

Recent years have seen the development of projectors having configurations that use a semiconductor light-emitting element such as a laser diode or LED (Light-Emitting Diode) as a light source for the purpose of realizing longer life of the light source and lower power consumption. In such projectors, the LED or laser diode is normally capable of supplying only light of a single wavelength, and configurations are thus known that use a phosphor to generate light (colored light) of a wavelength that differs from the light that is generated in the light source.

FIG. 1 is a block diagram showing an example of the configuration of a projector provided with a phosphor. FIG. 2 shows an example of the configuration of the phosphor wheel shown in FIG. 1, (a) of this figure being a plan view of the phosphor and (b) being a plan view of the phosphor wheel.

FIG. 3 is a graph showing an example of the quantity of emitted light of the phosphor wheel shown in FIG. 1, FIG. 4 is a graph showing an example of the quantity of emitted light of two phosphor wheels having the characteristics shown in FIG. 3 and the quantity of the synthesized light of these phosphor wheels.

The projector shown in FIG. 1 is provided with excitation light source 101, dichroic mirror 102, phosphor wheel 103, display device 104, projection lens 105, video processing circuit 106, phosphor rotation control unit 107, motor drive circuit 108, and motor 109.

Light that is emitted at excitation light source 101 is reflected by dichroic mirror 102 and irradiated upon the phosphor that is fixed upon phosphor wheel 103. The phosphor is excited by the light from excitation light source 101 and emits light of a wavelength that differs from this light. Dichroic mirror 102 is formed to have the characteristics of reflecting light that is emitted by excitation light source 101 and transmitting light that is emitted by the phosphor. As a result, light that is emitted by the phosphor is transmitted through dichroic mirror 102 and irradiated upon display device 104. Display device 104, by optically modulating the irradiated light in accordance with a picture signal that is supplied from video processing circuit 106, forms a picture that corresponds to the color of the irradiated light. The picture formed by display device 104 is enlarged and projected upon, for example, a screen (not shown) by projection lens 105.

Video processing circuit 106 both supplies a picture signal to display device 104 and supplies a signal indicating the drive cycle of display device 104 to phosphor rotation control unit 107. Phosphor rotation control unit 107 realizes control such that the rotational speed of motor 109 is fixed by means of motor drive circuit 108 in accordance with a signal that indicates the drive cycle of display device 104. Phosphor wheel 103 is secured to the rotational axis of motor 109, and phosphor wheel 103 rotates while synchronized to, for example, a signal indicating the drive cycle of display device 104 that is supplied from video processing circuit 106.

Phosphor wheel 103 is of a configuration in which phosphor 201 that is thinly cut as shown in FIG. 2 is adhered and fixed upon disk 202. When this phosphor wheel 103 is rotated by means of motor 109, light from excitation light source 101 is not continuously irradiated upon one point of phosphor 201. As a result, damage by burning of phosphor 201 by light from excitation light source 101 can be prevented. In addition, phosphor 201 is further cooled by the rotation of phosphor wheel 103 and phosphor 201 can therefore be caused to emit light efficiently.

Nevertheless, as shown in FIG. 2 (a) and (b), phosphor 201 is adhered and fixed upon disk 202 along the circumference divided into, for example, six segments, and therefore has seams 203 between adjacent phosphors 201. Accordingly, light that is emitted by phosphor wheel 103 cyclically decreases in brightness (quantity of emitted light) as shown in the graph of FIG. 3. The cycle of this decrease in the quantity of emitted light is synchronized with the drive cycle of display device 104 shown in FIG. 1 and therefore causes flicker in the projected picture.

Still further, in order to achieve an increase in the brightness of projected light, projectors in recent years may be of a configuration provided with a plurality of phosphor wheels 103 in which light emitted by each phosphor wheel 103 is synthesized and the light that follows synthesis is irradiated upon display device 104. In a configuration provided with such a plurality of phosphor wheels 103, this flicker in the projected picture may be exacerbated.

For example, in a projector provided with two phosphor wheels, one phosphor wheel is "a" and the other phosphor wheel is "b". A case will be considered in which, as shown in FIG. 4, the quantity of emitted light of portions of phosphor wheel a other than seams 203 is La, the quantity of emitted light that decreases at seams 203 is ΔLa, the quantity of emitted light of portions of phosphor wheel b other than seams 203 is Lb, the quantity of emitted light that decreases at seams 203 is ΔLb, and phosphor wheels a and b are rotated in synchronization.

In this case, as shown by the quantity of synthesized light of FIG. 4, when phosphor wheels a and b rotate such that seams 203 coincide (are synchronized), the quantity of emitted light following synthesis realized by the two phosphor wheels a and b is La+Lb, but the quantity of the decrease in emitted light at seams 203 increases to ΔLa+ΔLb. As a result, flicker in the projected picture increases.

Configurations in which a semiconductor light-emitting element is used as the light source and light of a wavelength that differs from the light emitted at the light source is generated by using a phosphor are described in Patent Documents 1 and 2.

Patent Document 1 discloses an improvement in the chromaticity of the blue light that irradiates a display device by providing a laser diode that emits laser light of a blue wavelength band and a phosphor that, using the laser light of the blue wavelength band as excitation light, emits light of a blue wavelength band that differs slightly in wavelength from the laser light of the blue wavelength band and then synthesizes the laser light of the blue wavelength band and the light of the blue wavelength band that is emitted by the phosphor.

Patent Document 2 discloses the adjustment of the quantity of emitted laser light of a blue wavelength band by a laser diode by performing PWM (Pulse Width Modulation) modulation of the current that is supplied to the laser diode that emits laser light of the blue wavelength band.

RELATED ART DOCUMENTS

Patent Documents

Patent Document 1: JP 2016-031402 A
Patent Document 2: JP 2015-203741 A

SUMMARY

It is an example object of the present invention to provide a projector that is provided with a plurality of phosphor wheels and a method of controlling the drive of the phosphor wheels to enable a reduction of flicker.

A projector according to an example aspect of the present invention for achieving the above-described object includes:
 a plurality of light sources;
 a plurality of phosphor wheels in which are affixed a plurality of arc-shaped segments of phosphor that takes light from the light sources as excitation light to emit light;
 a synthesizing optical system that synthesizes light that is emitted by the plurality of phosphor wheels; and
 a phosphor rotation control unit that controls the rotation of the plurality of phosphor wheels such that the timing at which the quantity of light emitted by the phosphor wheels becomes a minimum value differs for each of the plurality of phosphor wheels.

Alternatively, a projector according to an example aspect of the present invention for achieving the above-described object includes:
 a plurality of light sources;
 a plurality of phosphor wheels in which are affixed a plurality of arc-shaped segments of phosphor that takes light from the light sources as excitation light to emit light;
 a synthesizing optical system that synthesizes light that is emitted by the plurality of phosphor wheels; and
 a phosphor rotation control unit that controls the rotation of the plurality of phosphor wheels such that the timing at which excitation light is irradiated upon seams of phosphor that is affixed to the phosphor wheels differs for each of the plurality of phosphor wheels.

On the other hand, a method according to an example aspect of the present invention is a drive control method that, in a projector having a plurality of light sources, a plurality of phosphor wheels in which are affixed a plurality of arc-shaped segments of phosphor that takes light from the light sources as excitation light to emit light, and a synthesizing optical system that synthesizes light that is emitted by the plurality of phosphor wheels, controls the rotation of the plurality of phosphor wheels such that the timing at which the quantity of light emitted by the phosphor wheels becomes a minimum value differs for each of the plurality of phosphor wheels.

EXAMPLE EMBODIMENT

The present invention is next described with reference to the accompanying drawings.

Figure 5:
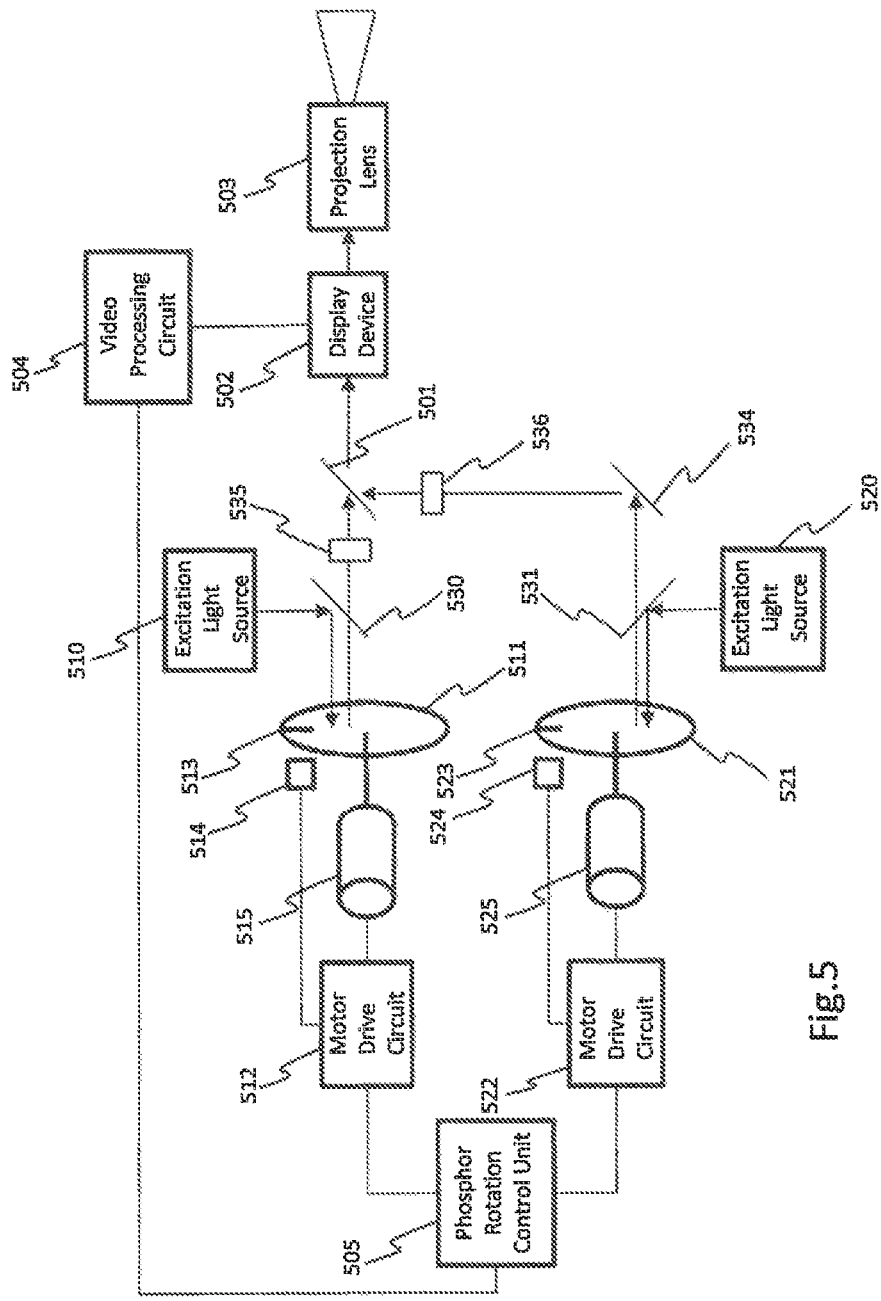
FIG. 5 is a block diagram showing an example of the configuration of a projector of the present invention.
Figure 6:
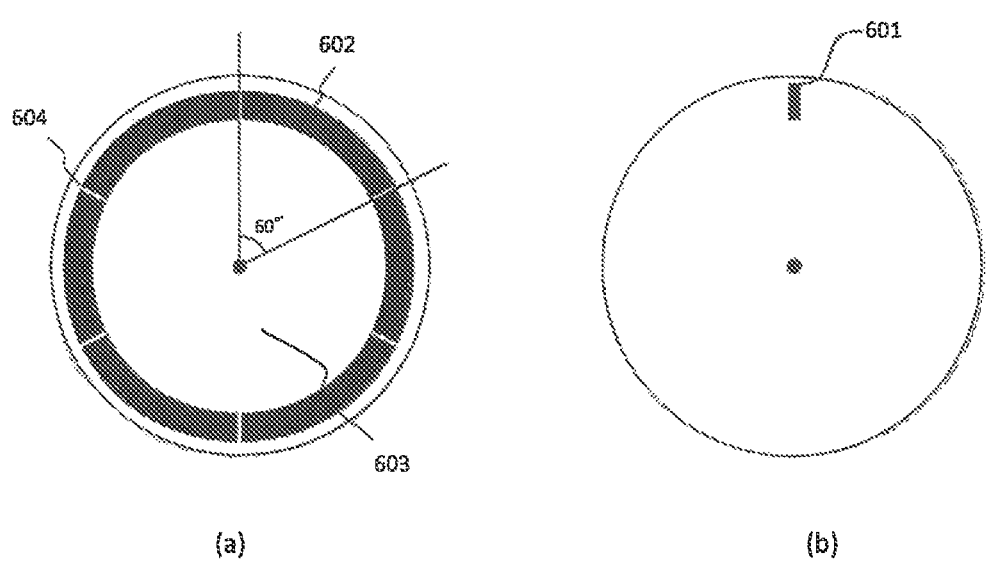
FIG. 6 shows an example of the configuration of the phosphor wheel shown in FIG. 5, FIG. 6(*a*) being a plan view showing the surface to which the phosphor is affixed and FIG. 6(*b*) being a plan view showing the surface on which the index shown in FIG. 5 is formed.

FIG. 5 is a block diagram showing an example of the configuration of a projector of the present invention. FIG. 6 shows an example of the configuration of a phosphor wheel shown in FIG. 5, FIG. 5(*a*) being a plan view showing the surface to which the phosphor is affixed and FIG. 5(*b*) being a plan view showing surface on which the index shown in FIG. 5 is formed.

As shown in FIG. 5, the projector of the present invention is provided with: excitation light sources 510 and 520, dichroic mirrors 530 and 531, reflecting mirror 534, polarization conversion elements 535 and 536, polarization beam splitter 501, phosphor wheels 511 and 521, display device 502, projection lens 503, video processing circuit 504, phosphor rotation control unit 505, motor drive circuits 512 and 522, motors 515 and 525, and optical sensors 514 and 524.

The projector shown in FIG. 5 is of a configuration that is provided with two excitation light sources 510 and 520 as well as with phosphor wheels 511 and 521 and that synthesizes the light emitted by phosphor wheels 511 and 521 to irradiation display device 502.

The light emitted by excitation light source 510 is reflected by dichroic mirror 530 and irradiated upon the phosphor that is fixed upon phosphor wheel 511. Similarly, the light that is emitted by excitation light source 520 is reflected by dichroic mirror 531 and irradiated upon the phosphor that is fixed to phosphor wheel 521.

The phosphor on phosphor wheel 511 is excited by the light from excitation light source 510 and emits light of a wavelength that differs from this light. Similarly, the phosphor on phosphor wheel 521 is excited by the light from excitation light source 520 and emits light of a wavelength that differs from this light. The phosphors of phosphor wheels 511 and 521 are assumed to each emit light of the same wavelength.

The light emitted by the phosphor on phosphor wheel 511 is transmitted through dichroic mirror 530 and irradiated into polarization conversion element 535. On the other hand, the light emitted by the phosphor on phosphor wheel 521 is transmitted through dichroic mirror 531 and irradiated into reflecting mirror 534, reflected by reflecting mirror 534, and irradiated into polarization conversion element 536.

Polarization conversion element 535 converts the light that is irradiated from dichroic mirror 530 into polarized light of one of two orthogonal polarizations and supplies the result as output. Further, polarization conversion element 536 converts the light that is irradiated from dichroic mirror 531 into polarized light of, of the two orthogonal polarizations, the polarization that differs from that of polarization conversion element 535 and supplies the result as output.

The polarized light that is supplied from polarization conversion element 535 and polarization conversion element 536 is synthesized at polarization beam splitter 501 and irradiated into display device 502.

In the projector shown in FIG. 5, the synthesizing optical system that synthesizes the light that is emitted from two phosphor wheels 511 and 521 is formed by dichroic mirrors 530 and 531, reflecting mirror 534, polarization conversion elements 535 and 536, as well as polarization beam splitter 501.

Display device 502 forms a picture that corresponds to the color of the irradiated light by optically modulating the irradiated light in accordance with a picture signal that is supplied from video processing circuit 504. The picture that is formed by display device 502 is enlarged and projected upon, for example, a screen (not shown) by projection lens 503.

Laser diodes that emit laser light of the blue wavelength band are an example of components that are used for excitation light sources 510 and 520. As the phosphor, for example, a phosphor that takes light of the blue wavelength band to emit light of the yellow wavelength band is used. Components such as a DMD (Digital Micro-mirror Device, a registered trademark) or a liquid crystal panel are used for display device 502.

Although FIG. 5 shows an example in which polarization conversion elements 535 and 536 as well as polarization beam splitter 501 are used to synthesize the light that has been emitted by phosphor wheels 511 and 512, the method of synthesizing light is not limited to the configuration shown in FIG. 5. For example, synthesis can also be realized by using respective reflecting mirrors to irradiate the light that has been transmitted through dichroic mirrors 530 and 531 into a synthesizing prism and by emitting the light in the same direction by means of the synthesizing prism.

As shown in FIG. 6 (*a*) and (*b*), phosphor wheels 511 and 521 are of a configuration in which phosphor 602 is adhered and affixed in six segments of the same size upon one surface of disk 603, and index 601 that can be read by optical sensors 514 and 524 as an index that indicates any one seam 604 of phosphor as a reference position is positioned on the other surface. Index 601 shown in FIG. 6 is equivalent to index 513 on phosphor wheel 511 and index 523 on phosphor wheel 521 shown in FIG. 5. In the present exemplary embodiment, the detection unit that detects the reference positions of phosphor wheels 511 and 521 is made up of optical sensors 514 and 524 as well as index 601.

As shown in FIG. 5, index 513 on phosphor wheel 511 is detected by optical sensor 514 and this detection signal is applied as input to motor drive circuits 512. Motor drive circuit 512 causes phosphor wheel 511 to rotate by driving motor 515. Similarly, index 523 on phosphor wheel 521 is detected by optical sensor 524 and this detection signal is applied as input to motor drive circuit 522. Motor drive circuit 522 causes phosphor wheel 521 to rotate by driving motor 525.

Figure 1:
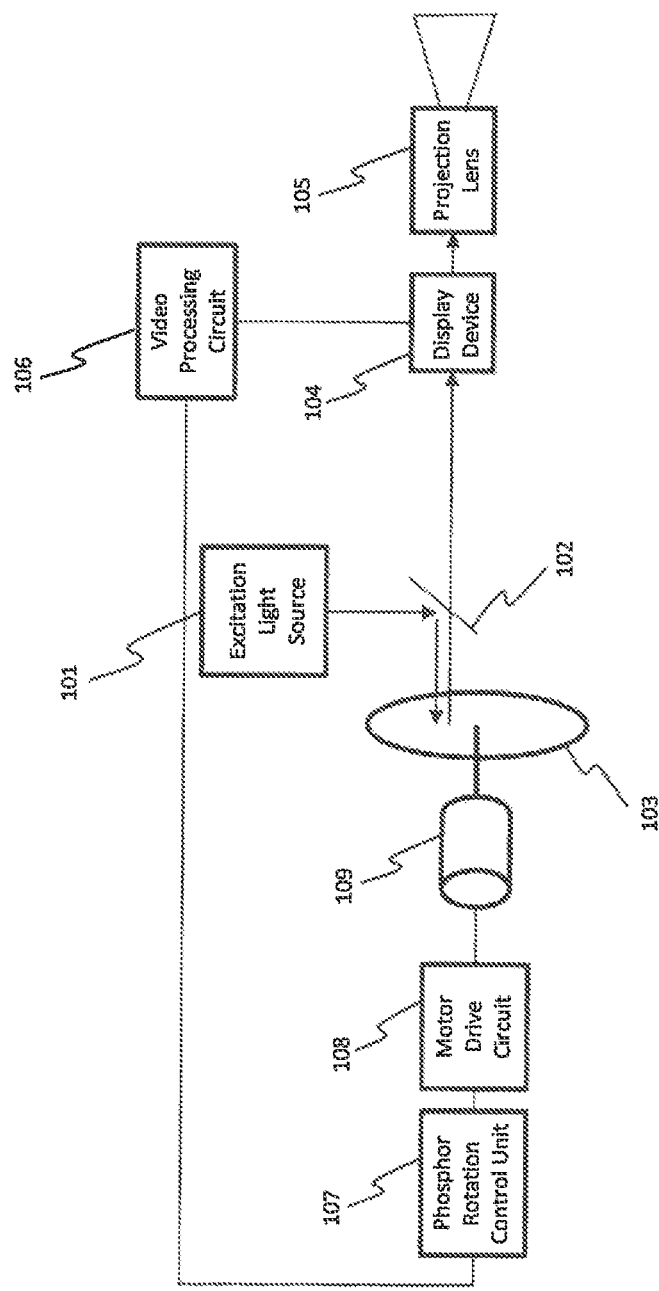
FIG. 1 is a block diagram showing an example of the configuration of a projector provided with a phosphor.
Figure 2:
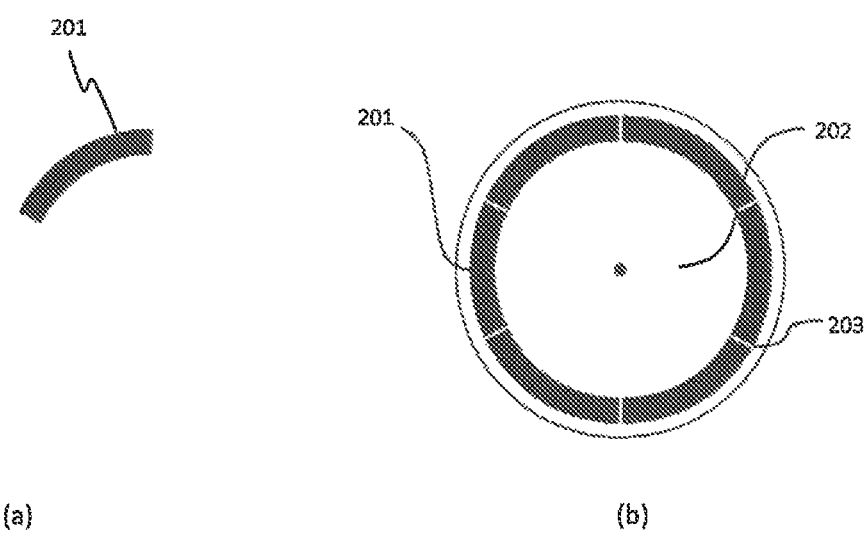
FIG. 2 shows an example of the configuration of the phosphor wheel shown in FIG. 1, FIG. 2(*a*) being a plan view of the phosphor and FIG. 2(*b*) being a plan view of a phosphor wheel.
Figure 3:
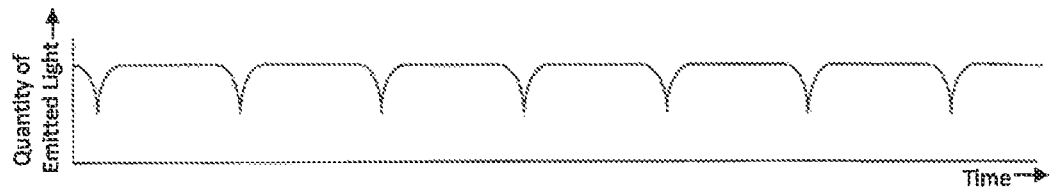
FIG. 3 is a graph showing an example of the quantity of emitted light of the phosphor wheel shown in FIG. 1.
Figure 4:
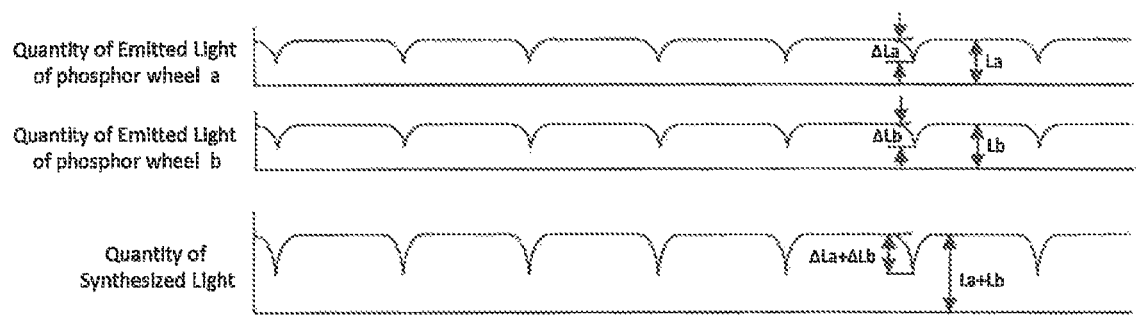
FIG. 4 is a graph showing an example of the quantity of emitted light of two phosphor wheels having the characteristics shown in FIG. 3 and the quantity of synthesized light of these phosphor wheels.

The rotation operation of phosphor wheels 511 and 521 is not limited to a configuration in which control is realized using indexes 513 and 523. For example, the quantity of emitted light from phosphor wheels 511 and 521 may be detected and rotation of phosphor wheels 511 and 521 then controlled to synchronize with the cycle of decrease in the quantity of emitted light. In this case, the position at which the quantity of emitted light decreases should be used as the reference position. When a plurality of phosphor segments are adhered and affixed upon phosphor wheels 511 and 521, the rotational speed of phosphor wheels 511 and 521 may be controlled according to the number of these phosphor segments. For example, when six segments of phosphor are adhered and affixed to each of phosphor wheels 511 and 521 as shown in FIG. 2(*b*) and FIG. 6(*a*), the rotation operation of phosphor wheels 511 and 521 may be controlled to synchronize with a cycle that is a multiple of six of the cycles of reduction in the quantity of emitted light.

Video processing circuit 504 both supplies a picture signal to display device 502 and supplies a signal indicating the drive cycle of display device 502 to phosphor rotation control unit 505. A picture synchronizing signal (such as a vertical synchronizing signal) is an example of the signal that may be used for the signal indicating the drive cycle of display device 502. Phosphor rotation control unit 505 effects control in accordance with the signal indicating the drive cycle of display device 502 such that the rotational speed of motor 515 is fixed by motor drive circuits 512. Phosphor rotation control unit 505 similarly effects control in accordance with the signal indicating the drive cycle of display device 502 such that the rotational speed of motor 525 is fixed by motor drive circuits 522. Phosphor rotation control unit 505 further effects control such that phosphor wheels 511 and 521 have the same rotational speed by means of motor drive circuits 512 and 522.

At this time, phosphor rotation control unit 505 calculates the number of revolutions (rotational speed) of phosphor wheels 511 and 521 with respect to the drive cycle of display device 502 from the signal that indicates the drive cycle of display device 502 that is supplied from video processing circuit 504.

Phosphor rotation control unit 505 further supplies a rotation timing signal for causing motors 515 and 525 to rotate at the calculated rotational speed to motor drive circuits 512 and 522. The rotation timing signal is a signal made up from, for example, a pulse series of a predetermined cycle, and motor drive circuits 512 and 522 effect the drive cycle such that motors 515 and 525 make one revolution in one pulse cycle. In other words, motor drive circuit 512 controls the rotational speed of motor 515 such that the pulse series of the rotation timing signal is synchronized with the signal indicating the position of index 513 that is detected by optical sensor 514. Similarly, motor drive circuit 522 controls the rotational speed of motor 525 such that the pulse series of the rotation timing signal is synchronized with the signal that indicates the position of index 523 that is detected by optical sensor 524.

Phosphor rotation control unit 505 of the present exemplary embodiment is further assumed to have the capability of supplying each of the rotation timing signals supplied to motor drive circuits 512 and 522 while shifting occurs at any angle (phase). Phosphor rotation control unit 505 can be realized by, for example, an information processing device (computer) that is equipped with a memory and a CPU (Central Processing Unit) that executes processing in accordance with a program.

Figure 7:
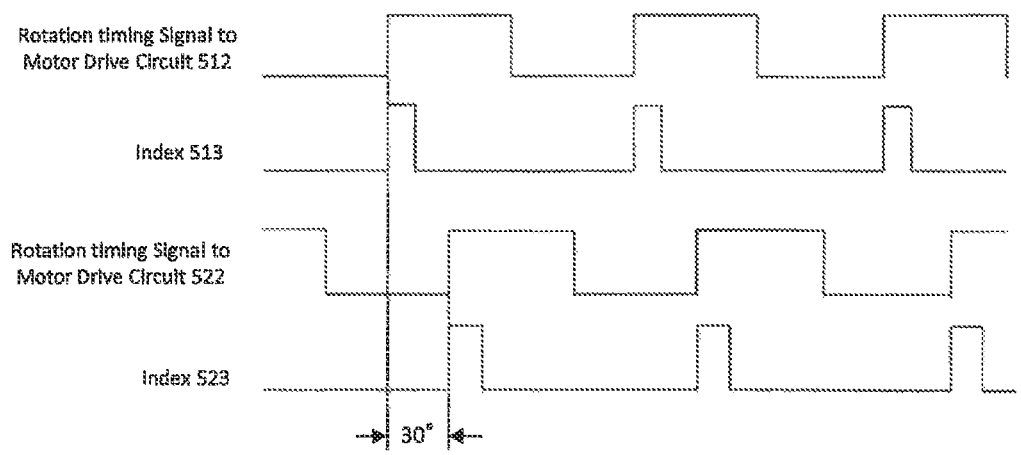
FIG. 7 is a graph showing an example of the relation of the rotation timing signal and the detection timing of the index by the optical sensor.
Figure 8:
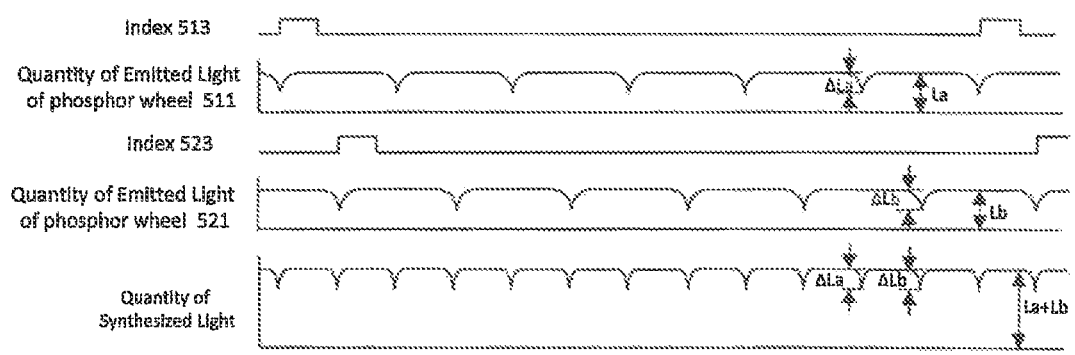
FIG. 8 is a graph showing an example of the quantity of emitted light of two phosphor wheels and the quantity of synthesized light of the phosphor wheels in a projector of the present exemplary embodiment.

FIG. 7 is a graph showing an example of the relation between the rotation timing signal and the detected timing of an index by an optical sensor, and FIG. 8 is a graph showing an example of the emitted light quantity and synthesized light quantity of the two phosphor wheels of the projector of the present exemplary embodiment.

As shown in FIG. 7, motor drive circuits 512 and 522 control the rotational speeds of motors 515 and 525 such that the signals that indicate the positions of indexes 513 and 523 that are detected by optical sensors 514 and 524 and the rotation timing signal that is supplied from phosphor rotation control unit 505 are in a fixed phase relation.

In the present exemplary embodiment, a phosphor is adhered and affixed in arc form in six segments of the same size upon each of phosphor wheels 511 and 521 as shown in FIG. 6, and as a result, the center angle of the arc that forms one segment of phosphor is 60 degrees. Accordingly, phosphor rotation control unit 505 confers a phase difference of 30 degrees to each of the rotation timing signals supplied to motor drive circuits 512 and 522 as shown in FIG. 7 and then supplies the signals.

As a result, phosphor wheels 511 and 521 both rotate with respective indexes (reference positions) 513 and 523 shifted by 30 degrees. In other words, phosphor wheels 511 and 521 rotate with seams 604 of respective phosphor 602 shifted by 30 degrees. In this case, the sites at which the quantity of emitted light decreases due to seams 604 of phosphor 602 are as shown in FIG. 8.

Here, the light quantity that is emitted at sites other than seams 604 of phosphor wheel 511 is defined as La, and the light quantity that decreases at seams 604 is ΔLa; and the light quantity that is emitted at sites other than seams 604 of phosphor wheel 512 is defined as Lb and the light quantity that decreases at seams 604 is ΔLb.

When the light emitted by two phosphor wheels 511 and 512 is then synthesized, as shown by the synthesized light quantity of FIG. 8, the light quantity at sites other than seams 604 is La+Lb, but the light quantity decrease caused by seams 604 is ΔLa or ΔLb. In this case, the period during which a decrease in the quantity of light occurs is twice that of a projector of the background art that is provided with a single phosphor wheel. As a result, flicker in the projected image of the projector of the present exemplary embodiment is more difficult for the human eye to perceive than for a projector of the background art that is provided with a single phosphor wheel.

Still further, if the proportion of change of the quantity of synthesized light is ΔLa/(La+Lb) or ΔLb/(La+Lb) and La and Lb as well as ΔLa and ΔLb are assumed to be equal, then the proportion of change of the quantity of synthesized light is one-half that of a projector of the background art that is provided with a single phosphor wheel. As a result, the projector of the present exemplary embodiment can further reduce flicker in the projected picture.

In other words, the rotation of the plurality of phosphor wheels is controlled such that the timing at which excitation light is irradiated upon seams (edges of the phosphor segments) of phosphor that is affixed to the phosphor wheels differs for each of the plurality of phosphor wheels, whereby flicker in the projected picture can be further reduced.

Stated differently, rotation of the plurality of phosphor wheels is controlled such that the timing at which the quantity of light that is emitted by the phosphor wheels becomes a minimum value differs for each of the plurality of phosphor wheels, whereby flicker in the projected picture can be further reduced.

Although an example was shown in the present exemplary embodiment in which the phosphor affixed to phosphor wheels 511 and 521 was in six segments, the number of phosphor segments on phosphor wheels 511 and 521 may be of any number, or the number of phosphor wheels 511 and 521 may be further increased according to the light quantity that is needed.

In this case, the angle ϕ of the reference position that is shifted for each phosphor wheel may be found by the following formula:

$$\phi = 360°/(\text{number of segments of phosphor} \times \text{number of phosphor wheels})$$

Although driving a plurality of phosphor wheels by a rotation timing signal having the phase difference shown by the above formula is ideal, the proportion of change of the quantity of synthesized light decreases as the number of phosphor wheels increases. Accordingly, the positions at which the light quantity decreases and that is caused by seams 604 of phosphor 602 need not be set at equal intervals and the obtaining a reduction in flicker can only be anticipated such that seams 604 of each phosphor wheel are not mutually synchronized.

In the present exemplary embodiment, moreover, an example was shown in which indexes 513 and 523 are attached to the other surfaces of phosphor wheels 511 and 521 on which phosphor 602 is not arranged, but as long as the indexes can be read by optical sensors 514 and 524, indexes 513 and 523 may also be attached to, for example, the axes of rotation of motors 515 and 525.

Still further, although an example has been shown in the present exemplary embodiment in which indexes 513 and 523 as well as optical sensors 514 and 524 are used to detect the reference positions of phosphor wheels 511 and 512, the reference positions of phosphor wheels 511 and 521 are not limited to a detection method that uses indexes and optical sensors. The reference positions of phosphor wheels 511 and 512 may also be detected by, for example, using Hall elements to measure the magnetic flux of magnets provided in motors 515 and 525.

Although the invention of the present application has been described with reference to an exemplary embodiment, the invention of the present application is not limited to the above-described exemplary embodiment. The configuration and details of the invention of the present application are open to various modifications within the scope of the invention of the present application that will be clear to one of ordinary skill in the art.

The invention claimed is:
1. A projector, comprising:
   a plurality of light sources;
   a plurality of phosphor wheels to which are affixed a plurality of segments of phosphor that takes light from said light sources as excitation light to emit light;
   a synthesizing optical system that synthesizes light that is emitted by said plurality of phosphor wheels;
   a phosphor rotation controller that controls a rotation of said plurality of phosphor wheels according to a number of the segments of phosphor such that a timing at which a quantity of light emitted by said phosphor wheels becomes a minimum value differs for each of said plurality of phosphor wheels; and
   detection units, that detect each reference position of said plurality of phosphor wheels,
   wherein said phosphor rotation controller controls the rotation of said plurality of phosphor wheels on a basis of said reference positions of each of said plurality of phosphor wheels that is detected by said detection units,
   wherein, when ϕ is an angle by which said reference positions are shifted for each of said plurality of phosphor wheels, said phosphor rotation controller is set to:

φ=360°/(the number of the segments of phosphor×a number of phosphor wheels), and wherein said plurality of phosohor wheels include a configuration in which the plurality of segments of phosohor, having a same size, are affixed in ring-shaped.

2. The projector according to claim 1, wherein one of said detection units comprises an optical sensor and an index that is readable by said optical sensor and that is affixed to said phosphor wheels.

3. The projector according to claim 1, wherein lights from said plurality of light sources are irradiated. upon said phosphor wheels that are different from each other.

4. The projector according to claim 1, wherein all of the phosphor wheels are coated with a plurality of phosphors, respectively.

5. The projector according to claim 1, wherein each of the phosphor wheels is coated with a plurality of phosphors.

6. The projector according to claim 1, wherein the synthesizing optical system synthesizes the light emitted by each of said plurality of phosphor wheels.

7. The projector according to claim 1, wherein the quantity of light includes a brightness of the light.

8. A projector, comprising:
a plurality of light sources;
a plurality of phosphor wheels to which are affixed a plurality of segments of phosphor that takes light from said light sources as excitation light to emit light;
a synthesizing optical system that synthesizes light that is emitted by said plurality of phosphor wheels;
a phosphor rotation controller that controls a rotation of said plurality of phosphor wheels according to a number of the segments of phosphor such that a timing at which excitation light is irradiated upon seams of phosphor that is affixed to said phosphor wheels differs for each of said plurality of phosphor wheels; and
detection units that detect each reference position of said plurality of phosphor wheels,
wherein said phosphor rotation controller controls the rotation of said plurality of phosphor wheels on a basis of said reference positions of each of said plurality of phosphor wheels that is detected by said detection units,
wherein, when φ is an angle by which said reference positions are shifted for each of said plurality of phosphor wheels, said phosphor rotation controller is set to:
φ=360°/(the number of the segments a phosphor×a number of phosphor wheels), and
wherein said plurality of phosphor wheels include a configaiation in which the plurality of segments of phosphor, having a same size, are affixed in ring-shaped.

9. The projector according to claim 8, wherein lights from said plurality of light sources are irradiated upon said phosphor wheels that are different from each other.

10. The projector according to claim 8, wherein all of the phosphor wheels are coated with a plurality of phosphors, respectively.

11. A drive control method of phosphor wheels in a projector including a plurality of phosphor wheels to which are affixed a plurality of segments of phosphor that takes light from a plurality of light sources as excitation light to emit light, said drive control method comprising:
controlling a rotation of said plurality of phosphor wheels according to a number of the segments of phosphor such that a timing at which a quantity of light emitted by said phosphor wheels becomes a minimum value differs for each of said plurality of phosphor wheels;
detecting reference positions of each of said phosphor wheels by a detection unit;
controlling the rotation of said plurality of phosphor wheels on a basis of said reference positions of each of said plurality of phosphor wheels that are detected by said detection unit; and
when φ is an angle by which said reference positions are shifted for each of said plurality of phosphor wheels, setting φ=360°/(the number of the segments a phosphor×a number of phosphor wheels),
wherein said plurality of phosphor wheels include a configaiation in which the plurality of segments of phosphor, having a same size, are affixed in ring-shaped.

12. The drive control method according to claim 11, wherein lights from said plurality of light sources are irradiated upon said phosphor wheels that are different from each other.

13. The drive control method according to claim 11, wherein all of the phosphor wheels are coated with a plurality of phosphors, respectively.

14. The drive control method according to claim 11, wherein the projector further includes a synthesizing optical system that synthesizes light that is emitted by said plurality of phosphor wheels.

15. A drive control method of phosphor wheels in a projector including a plurality of phosphor wheels to which are affixed a plurality of segments of phosphor that takes light from a light source as excitation light to emit light, said drive control method comprising:
controlling a rotation of said plurality of phosphor wheels according to a number of the segments of phosphor such that a timing at which a quantity of light emitted by said phosphor wheels becomes a minimum value differs for each of said plurality of phosphor wheels;
detecting reference positions of each of said phosphor wheels by a detection unit;
controlling the rotation of said plurality of phosphor wheels on a basis of said reference positions of each of said plurality of phosphor wheels that are detected by said detection unit; and
when φ is an angle by which said reference positions are shifted for each of said plurality of phosphor wheels, setting φ=360°/(the number of the segments a phosphor×a number of phosphor wheels),
wherein said plurality of phosphor wheels include a configaiation in which the plurality of segments of phosphor, having a same size, are affixed in ring-shaped.

16. The drive control method according to claim 15, wherein light from said light source is irradiated upon said phosphor wheels that are different from each other.

* * * * *